United States Patent
Ando et al.

(10) Patent No.: US 12,206,079 B2
(45) Date of Patent: Jan. 21, 2025

(54) WASTE LITHIUM-ION BATTERY ROASTING APPARATUS

(71) Applicant: KAWASAKI JUKOGYO KABUSHIKI KAISHA, Kobe (JP)

(72) Inventors: Fuminori Ando, Kobe (JP); Hiroaki Osawa, Kobe (JP); Mariko Yamashita, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 807 days.

(21) Appl. No.: 17/436,969

(22) PCT Filed: Feb. 28, 2020

(86) PCT No.: PCT/JP2020/008419
§ 371 (c)(1),
(2) Date: Sep. 7, 2021

(87) PCT Pub. No.: WO2020/179695
PCT Pub. Date: Sep. 10, 2020

(65) Prior Publication Data
US 2022/0173447 A1 Jun. 2, 2022

(30) Foreign Application Priority Data
Mar. 4, 2019 (JP) .................................. 2019-038150

(51) Int. Cl.
*H01M 10/54* (2006.01)
*H01M 10/04* (2006.01)
(Continued)

(52) U.S. Cl.
CPC ....... *H01M 10/54* (2013.01); *H01M 10/0422* (2013.01); *H01M 10/0525* (2013.01); *H01M 10/615* (2015.04)

(58) Field of Classification Search
CPC ............... H01M 10/54; H01M 10/615; H01M 10/0422; H01M 10/0525
See application file for complete search history.

(56) References Cited

FOREIGN PATENT DOCUMENTS

| CN | 107342444 A | 11/2017 |
|---|---|---|
| CN | 109103537 | * 12/2018 |

(Continued)

OTHER PUBLICATIONS

JP 2017037807 English translation. Owada et al. Feb. 16, 2017. (Year: 2017).*

(Continued)

*Primary Examiner* — Christopher P Domone
(74) *Attorney, Agent, or Firm* — Oliff PLC

(57) ABSTRACT

A waste lithium-ion battery roasting apparatus includes: a transport mechanism including a cylindrical body, the cylindrical body containing an internal atmosphere that is a reducing atmosphere or a low-oxygen atmosphere; a heating mechanism that heats an outer wall of the cylindrical body to increase an internal temperature of the cylindrical body, and controls heating temperatures individually at which the heating mechanism heats the outer wall at different respective positions in a transporting direction in which the transport mechanism transports a waste lithium-ion battery; and a controller that controls the heating temperatures, at which the heating mechanism heats the outer wall, in accordance with a transporting speed at which the transport mechanism transports the waste lithium-ion battery, such that a temperature increase rate of the waste lithium-ion battery transported inside the cylindrical body is a predetermined temperature increase rate.

3 Claims, 2 Drawing Sheets

(51) Int. Cl.
*H01M 10/0525* (2010.01)
*H01M 10/615* (2014.01)

(56) References Cited

FOREIGN PATENT DOCUMENTS

| | | | |
|---|---|---|---|
| CN | 109326843 | * | 2/2019 |
| JP | 2000-292068 | A | 10/2000 |
| JP | 2016-022395 | A | 2/2016 |
| JP | 2017-37807 | A | 2/2017 |
| JP | 2017-37818 | A | 2/2017 |
| JP | 2018-026279 | A | 2/2018 |
| JP | 2018-159477 | A | 10/2018 |
| WO | 2012/132072 | A1 | 10/2012 |

OTHER PUBLICATIONS

CN109326843 English translation. Xu et al. Feb. 12, 2019. (Year: 2019).*
CN109103537 English translation. Yang et al. Dec. 28, 2018 (Year: 2018).*
Nov. 9, 2022 Extended European Search Report issued in European Patent Application No. 20766152.1.
Horiuchi, Kengo et al., "Investigation of Heating Conditions for Cobalt Recycling From Spent Lithium Ion Batteries by Magnetic Separation", vol. 43, No. 4, pp. 213-218, Kagaku Kogaku Ronbunshu (Chemical Engineering Journals in Japanese) published in 2017 by The Society of Chemical Engineers, Japan.

* cited by examiner

WASTE LITHIUM-ION BATTERY ROASTING APPARATUS

CROSS REFERENCE TO RELATED APPLICATIONS

This is a National Phase Application of International Patent Application No. PCT/JP2020/008419 filed on Feb. 28, 2020, which is based upon and claims the benefit of priority from Japanese Patent Application No. 2019-038150 filed Mar. 4, 2019. The entire disclosure of all of the above applications is incorporated herein by reference.

TECHNICAL FIELD

The present invention relates to a waste lithium-ion battery roasting apparatus.

BACKGROUND ART

Lithium-ion batteries (LIB) are widely used in electric automobiles, mobile phones, laptop computers, etc. A lithium-ion battery includes, for example, a cathode material, an anode material, an electrolyte solution, and a separator. The cathode material is formed in such a manner that a cathode active material, such as lithium cobalt oxide, lithium nickel oxide, or lithium manganese oxide, is fixed to an aluminum foil by a fluorine-based binder. The anode material is formed in such a manner that an anode active material, such as graphite, is fixed to a copper foil by a fluorine-based binder.

In order to recover useful metals such as cobalt, nickel, manganese, and lithium from lithium-ion batteries to be discarded (waste lithium-ion batteries), such as spent lithium-ion batteries, heat treatment (roasting) is performed thereon for the purpose of detoxifying the electrolyte solution and reducing the volume of combustibles, such as the separator and the binder.

For example, Patent Literature 1 discloses a configuration including a circular heat treatment furnace provided with a single furnace door. In Patent Literature 1, heat-resistant containers, each of which stores therein a battery pack or a battery module made up of multiple lithium-ion batteries, are sequentially fed into the heat treatment furnace by opening and closing the furnace door. The temperature of the heat treatment furnace is set to a constant temperature. In the heat treatment furnace, the heat-resistant containers are subjected to heat treatment. Then, the heat-resistant containers are sequentially discharged from the heat treatment furnace by opening and closing the furnace door.

In relation to recovering cobalt from a waste lithium-ion battery, Non-Patent Literature 1 compares a case where the temperature increase rate in heat treatment performed on the waste lithium-ion battery is 30 K/min and a case where the temperature increase rate in heat treatment performed on the waste lithium-ion battery is 2 K/min. Results of the comparison indicate that in the case where the temperature increase rate is 2 K/min, the grain size of the cobalt component is greater, and also, the cobalt recovery rate is higher in a subsequent recovery process, in which cobalt is recovered by, for example, physical sorting that utilizes, for example, magnetic separation.

CITATION LIST

Patent Literature

PTL 1: Japanese Laid-Open Patent Application Publication No. 2016-22395

Non-Patent Literature

NPL 1: "Investigation of heating conditions for cobalt recycling from spent lithium ion batteries by magnetic separation" co-authored by Kengo Horiuchi, Mitsuaki Matsuoka, Chiharu Tokoro, Shuji Owada, and Shojiro Usui, vol. 43, No. 4, pp. 213-218, Kagaku Kogaku Ronbunshu (Chemical Engineering Journals in Japanese) published in 2017 by The Society of Chemical Engineers, Japan.

SUMMARY OF INVENTION

Technical Problem

In the configuration of Patent Literature 1, since each heat-resistant container is fed into and discharged from the heat treatment furnace through the single furnace door, there is room for improvement in terms of heat treatment efficiency. Non-Patent Literature 1 does not disclose any specific configuration for performing the heat treatment.

The present invention has been made to solve the above-described problems, and an object of the present invention is to provide a waste lithium-ion battery roasting apparatus that makes it possible to improve heat treatment efficiency and to improve a useful metal recovery rate.

Solution to Problem

In order to achieve the above object, a waste lithium-ion battery roasting apparatus according to one aspect of the present invention includes: a transport mechanism including a cylindrical body whose one end is a receiving inlet and whose another end is a discharging outlet, the cylindrical body containing an internal atmosphere that is a reducing atmosphere or a low-oxygen atmosphere, the transport mechanism receiving a waste lithium-ion battery through the receiving inlet, transporting the waste lithium-ion battery inside the cylindrical body toward the discharging outlet, and discharging the waste lithium-ion battery from the discharging outlet; a heating mechanism that heats an outer wall of the cylindrical body to increase an internal temperature of the cylindrical body, and controls heating temperatures individually at which the heating mechanism heats the outer wall at different respective positions in a transporting direction in which the transport mechanism transports the waste lithium-ion battery; and a controller that controls the heating temperatures, at which the heating mechanism heats the outer wall, in accordance with a transporting speed at which the transport mechanism transports the waste lithium-ion battery, such that a temperature increase rate of the waste lithium-ion battery transported inside the cylindrical body is a predetermined temperature increase rate.

According to the above configuration, the processes of receiving and discharging the waste lithium-ion battery can be performed continuously by the transport mechanism. This makes it possible to improve heat treatment efficiency. In addition, by setting the predetermined temperature increase rate to a suitable temperature increase rate for increasing the grain size of useful metal components such as cobalt, the useful metal recovery rate in a subsequent recovery process, in which the useful metals are recovered by, for example, physical sorting that utilizes, for example, magnetic separation, can be improved.

In the above roasting apparatus, the cylindrical body of the transport mechanism may be a circular cylindrical body supported in such a manner that the circular cylindrical body is rotatable about its center axis, the transport mechanism rotating the circular cylindrical body to transport the waste lithium-ion battery from the receiving inlet toward the discharging outlet at a transporting speed corresponding to a rotation speed of the circular cylindrical body. The heating mechanism may include heaters that heat the outer wall of the circular cylindrical body, the heaters being arranged side by side in the transporting direction, in which the transport mechanism transports the waste lithium-ion battery, the heating mechanism controlling heating temperatures individually at which the respective heaters heat the outer wall.

The above roasting apparatus may further include a temperature detector that detects internal temperatures of the circular cylindrical body at different respective detection positions in the transporting direction of the waste lithium-ion battery. The controller may: calculate target temperatures corresponding to the respective detection positions based on the predetermined temperature increase rate and the rotation speed of the circular cylindrical body, the target temperatures enabling adjustment of the temperature increase rate of the waste lithium-ion battery to the predetermined temperature increase rate; and adjust the heating temperatures, at which the respective heaters heat the outer wall, such that the internal temperature detected at each detection position by the temperature detector is the target temperature corresponding to each detection position.

Advantageous Effects of Invention

The present invention is configured as described above, and has an advantage of being able to provide a waste lithium-ion battery roasting apparatus that makes it possible to improve heat treatment efficiency and to improve a useful metal recovery rate.

DESCRIPTION OF EMBODIMENTS

Hereinafter, a preferred embodiment of the present invention is described with reference to the drawings. The present invention is not limited to the embodiment described below.

Embodiment

Figure 1:
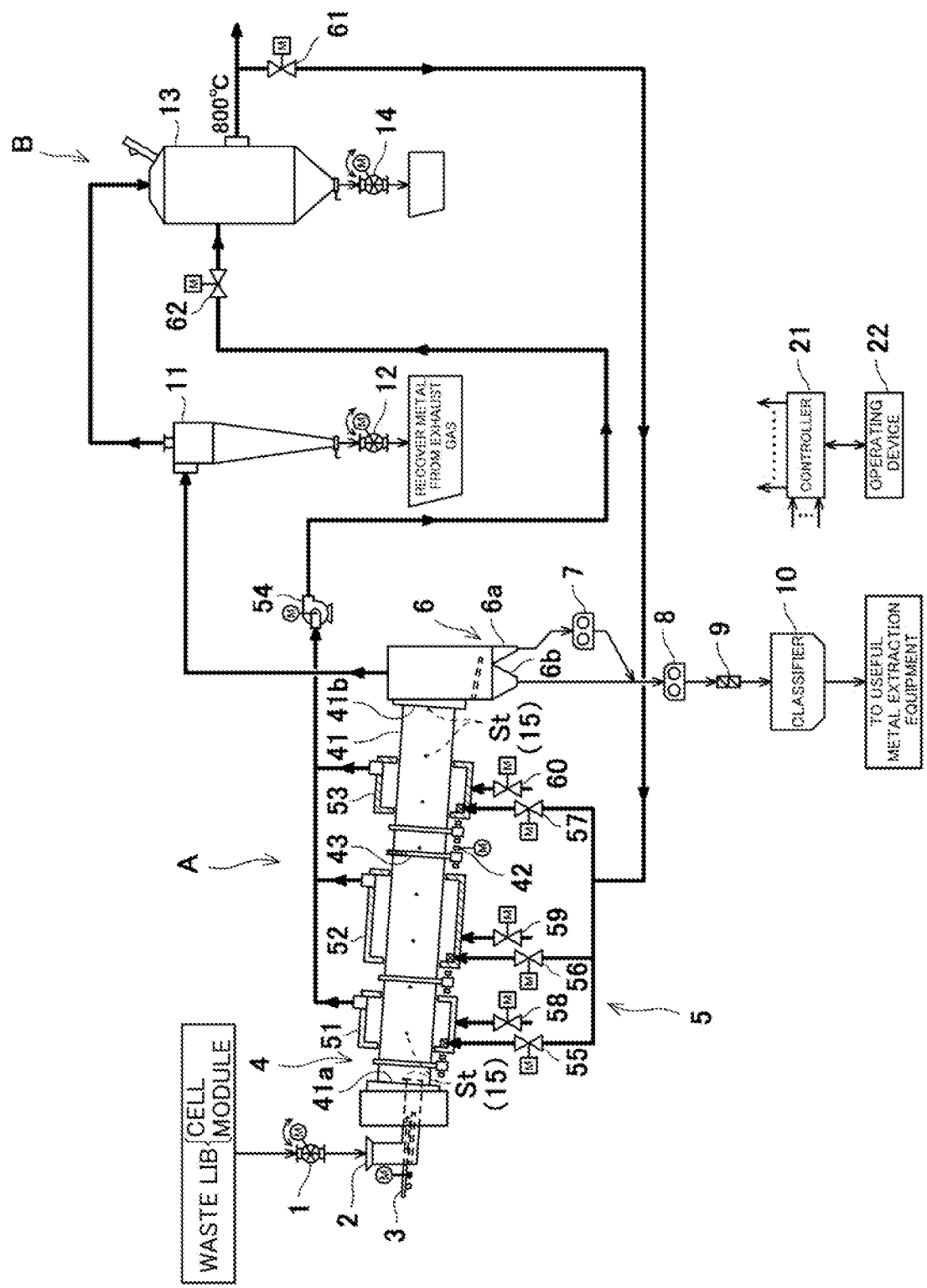
FIG. 1 is a schematic diagram schematically showing a processing system including a waste lithium-ion battery roasting apparatus according to one example of an embodiment.

FIG. 1 is a schematic diagram schematically showing a processing system including a waste lithium-ion battery roasting apparatus according to one example of the embodiment.

The waste lithium-ion battery processing system shown in FIG. 1 includes, for example, a waste lithium-ion battery roasting apparatus A and exhaust gas treatment equipment B.

The waste lithium-ion battery roasting apparatus A is capable of roasting cells and modules of waste lithium-ion batteries (waste LIBs). Each module is made up of multiple cells (battery cells) combined together.

The roasting apparatus A includes a waste lithium-ion battery feeder 1, a feeding inlet 2, a pusher 3, a transport mechanism 4, a heating mechanism 5, roasted product take-out outlets 6, a temperature detector 15 including temperature sensors St, a controller 21, and an operating device 22. In this example, the controller 21 and the operating device 22 are used as a controller and an operating device of the entire processing system shown in FIG. 1.

The feeder 1 is, for example, a rotary feeder. The feeder 1 receives waste lithium-ion battery cells and modules fed from the outside, and sequentially feeds the cells and modules to the feeding inlet 2. The pusher 3 pushes and feeds the waste lithium-ion battery cells and modules, which are sequentially fed to the feeding inlet 2, to the transport mechanism 4.

The transport mechanism 4 includes a cylindrical body 41. One end of the cylindrical body 41 is a receiving inlet 41a, and the other end is a discharging outlet 41b. The cylindrical body 41 is a circular cylindrical body. The cylindrical body 41 is supported in such a manner that the cylindrical body 41 is rotatable about its center axis and is inclined with a predetermined angle such that the cylindrical body 41 is sloped downward from the receiving inlet 41a toward the discharging outlet 41b. The cylindrical body 41 is rotated by a driver 42. The driver 42 is a device that includes a motor for rotating a girth gear 43 fixed to the outer periphery of the cylindrical body 41. The driver 42 is a known device included in an external heat type rotary kiln that will be described below.

The internal atmosphere of the cylindrical body 41 is a reducing atmosphere or a low-oxygen atmosphere (having an oxygen concentration of 10% or lower). The waste lithium-ion batteries (i.e., cells and/or modules) fed by the pusher 3 into the cylindrical body 41 through the receiving inlet 41a are moved (transported) toward the discharging outlet 41b by the rotation of the cylindrical body 41, and are then discharged from the discharging outlet 41b through the roasted product take-out outlets 6.

The heating mechanism 5 includes heaters 51, 52, and 53 for heating the outer wall of the cylindrical body 41. These heaters 51, 52, and 53 are arranged side by side in the transporting direction of the waste lithium-ion batteries (in the center axis direction of the cylindrical body 41), and each of the heaters 51, 52, and 53 surrounds the outer periphery of the cylindrical body 41.

High-temperature gas (e.g., 800° C.) from a secondary combustion chamber 13 is fed into the heaters 51, 52, and 53 via an electrically operated valve 61 and electrically operated valves 55, 56, and 57. Normal-temperature gas (air) is also fed into the heaters 51, 52, and 53 via electrically operated valves 58, 59, and 60. Meanwhile, gas in each of the heaters 51, 52, and 53 is fed by a fan 54 into the secondary combustion chamber 13 via an electrically operated valve 62.

For example, the controller 21 controls the opening degree of each of the electrically operated valves 55, 56, 57, 58, 59, and 60, and thereby gas temperatures in the respective heaters 51, 52, and 53 can be controlled individually. By thus controlling the gas temperatures in the respective heaters 51, 52, and 53, i.e., heating temperatures (=gas temperatures) at which the respective heaters 51, 52, and 53 heat the outer wall of the cylindrical body 41, the internal temperature of the cylindrical body 41 is controlled.

The transport mechanism 4 and the heating mechanism 5 are configured such that, in a well-known external heat type rotary kiln that includes the cylindrical body 41 (an internal cylinder) and a heating jacket (an external cylinder) for heating the cylindrical body 41, the heating jacket is divided into multiple segments that are the heaters 51, 52, and 53, and the heating temperatures at which the respective heaters 51, 52, and 53 perform the heating can be controlled individually.

Inside the cylindrical body 41, the temperature sensors St, which are, for example, thermocouples, are arranged at respective predetermined positions, for example, at regular intervals in the transporting direction of the waste lithium-ion batteries (in the center axis direction of the cylindrical body 41). The temperature detected by each temperature sensor St is outputted to the controller 21. Accordingly, the temperature detector 15, which includes the temperature sensors St, detects internal temperatures of the cylindrical body 41 at different respective positions in the transporting direction of the waste lithium-ion batteries, and outputs the detected temperatures to the controller 21. The internal temperatures of the cylindrical body 41 are always detected by the respective temperature sensors St, and the detected temperatures are inputted to the controller 21. In this manner, the controller 21 can monitor the temperatures detected by the respective temperature sensors St and the positions at which the respective temperatures are detected (i.e., temperature detection positions). The controller 21 prestores therein the positions of the respective temperature sensors St (i.e., the temperature detection positions).

Exhaust gas generated in the cylindrical body 41 is fed to a cyclone 11 of the exhaust gas treatment equipment B, and in the cyclone 11, solid fine particles in the exhaust gas, such as metal particles, are separated from the exhaust gas. The solid fine particles separated from the exhaust gas are recovered by, for example, a rotary feeder 12. Meanwhile, the exhaust gas from which the solid fine particles have been separated is fed from the cyclone 11 to the secondary combustion chamber 13.

In the secondary combustion chamber 13, the exhaust gas fed from the cyclone 11, and the gas fed from the heaters 51, 52, and 53, are heated by a burner to a high temperature (e.g., 800° C.). Then, part of the high-temperature gas is fed to the roasting apparatus A via the electrically operated valve 61. Although not illustrated, the rest of the high-temperature gas is discharged from a chimney via, for example, a bag filter. Residue is collected from the secondary combustion chamber 13 via a rotary feeder 14. The exhaust gas treatment equipment B includes the cyclone 11, the rotary feeder 12, the secondary combustion chamber 13, the rotary feeder 14, the unshown bag filter, the unshown chimney, and so forth.

At the roasted product take-out outlets 6, the roasted cells and modules are sorted from each other based on their sizes. The modules are fed to a crusher 7 through one discharging outlet 6a, and the cells are fed to a crusher 8 through the other discharging outlet 6b. Each module is crushed by the crusher 7 into pieces, each of which is roughly in the size of a cell, and then fed to the crusher 8. The crusher 8 further crushes these crushed pieces into smaller pieces together with the cells.

The crushed products of the cells and modules crushed by the crusher 8 are fed to a classifier 10 via a double flap damper (two-stage damper) 9. For example, the classifier 10 sorts the crushed products into massive materials and powdery and granular materials by using a sieve, such as a vibration sieve. The massive materials contain, for example, copper and aluminum. The powdery and granular materials contain useful metals such as cobalt. The powdery and granular materials sorted by the classifier 10 are fed to useful metal extraction equipment, by which useful metals such as cobalt, nickel, manganese, and lithium are extracted from the powdery and granular materials.

The controller 21 is a computer that includes, for example, an operational processor such as a CPU and memories such as a ROM and RAM. The CPU executes a predetermined program prestored in a memory, thereby controlling the operations of the entire processing system shown in FIG. 1. The controller 21 may be a single controller performing centralized control, or may be multiple controllers performing distributed control in cooperation with each other.

An operator operates the operating device 22. The operating device 22 receives operation inputs, such as an operation input to start or stop the operation of each part of the processing system shown in FIG. 1. In response to an operation input made by the operator, the operating device 22 outputs operation input information to the controller 21. The controller 21 outputs information indicating, for example, the operating state of each part of the processing system. The information outputted from the controller 21 is inputted to the operating device 22. The operating device 22 includes a display that displays the inputted information.

Next, one example of the operations of, in particular, the waste lithium-ion battery roasting apparatus A of the processing system shown in FIG. 1 is described.

Generally speaking, the rotation speed of the rotary kiln is set such that the filling rate of to-be-processed objects in the cylindrical body is constant. Also in the present embodiment, the rotation speed of the cylindrical body 41 is set such that the filling rate of to-be-processed objects (waste lithium-ion batteries) in the cylindrical body 41 is constant. For example, the rotation speed can be set through an operation of the operating device 22 by the operator. Then, the controller 21 controls the driver 42 to rotate the cylindrical body 41 at the set rotation speed.

For example, the filling rate X (%) of the to-be-processed objects in the cylindrical body 41 can be calculated by using an equation (1) shown below.

$$X = H \times T / Vi \times 100 \tag{1}$$

In the equation (1), H is the feeding amount of the to-be-processed objects per minute (m³/min); T is the retention time of the to-be-processed objects in the cylindrical body 41 (min); and Vi is the volume of the interior of the cylindrical body 41 (m³).

The retention time T (min) is a necessary amount of time for the to-be-processed objects to move from the receiving inlet 41a of the cylindrical body 41 to the discharging outlet 41b. The retention time T (min) is inversely proportional to the rotation speed (N) of the cylindrical body 41.

Accordingly, the filling rate X is proportional to the feeding amount H of the to-be-processed objects per minute, and is inversely proportional to the rotation speed N of the cylindrical body 41 ($X \propto H/N$). For example, in a case where the feeding amount H of the to-be-processed objects per minute is changed due to a change in the feeding amount (processing amount) of the to-be-processed objects fed into the roasting apparatus A per day, it is necessary to change the rotation speed N of the cylindrical body 41 in order to make the filling rate X of the to-be-processed objects constant. The rotation speed N of the cylindrical body 41 is proportional to the transporting speed of the to-be-processed objects transported inside the cylindrical body 41 from the receiving inlet 41a toward the discharging outlet 41b. Therefore, changing the rotation speed N of the cylindrical body 41 is the same as changing the transporting speed of the to-be-processed objects.

In the present embodiment, the controller 21 controls the heating temperatures (gas temperatures) at which the respective heaters 51 to 53 perform the heating, such that the temperature increase rate of the to-be-processed objects is a predetermined temperature increase rate (Tv). Specifically, the controller 21 controls the heating temperatures at which the respective heaters 51 to 53 perform the heating by controlling (adjusting) the opening degrees of the respective electrically operated valves 55 to 60. The predetermined temperature increase rate Tv is preset (prestored) in the controller 21 through an operation of the operating device 22 by the operator. The setting value of the temperature increase rate Tv can be changed by operating the operating device 22.

In a case where the rotation speed N of the cylindrical body 41 is changed, the controller 21 changes the heating temperatures at which the respective heaters 51 to 53 perform the heating, such that the temperature increase rate of the to-be-processed objects is the predetermined temperature increase rate (Tv). This is described hereinafter with reference to FIGS. 2A and 2B.

Figure 2A:
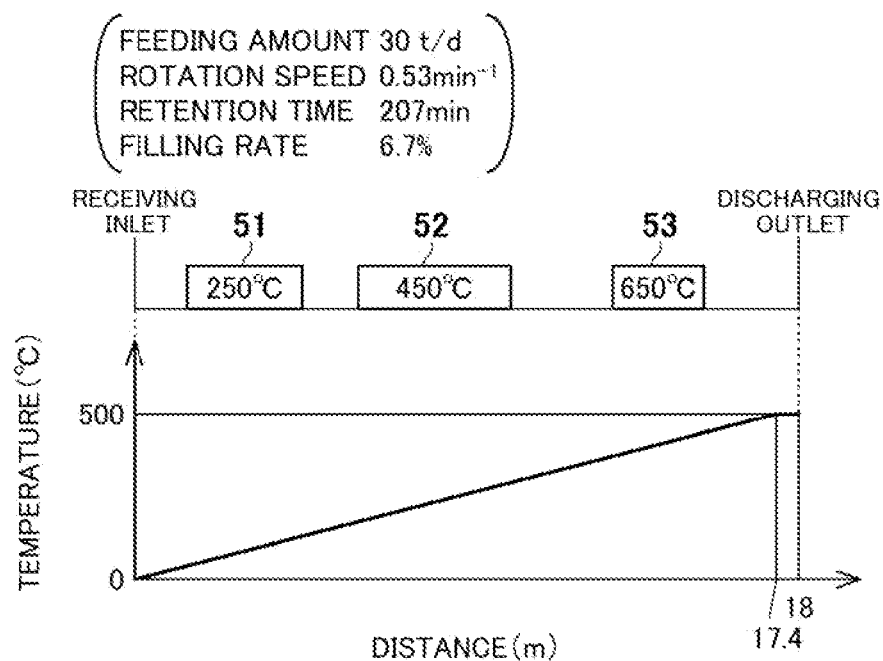
FIGS. 2A and 2B show respective cases where the feeding amount of to-be-processed objects fed into the roasting apparatus per day is different from each other, and FIGS. 2A and 2B each show one example of a graph indicating heating temperatures at which respective heaters perform heating and a target internal temperature of a cylindrical body of the roasting apparatus from a receiving inlet to a discharging outlet of the cylindrical body.
Figure 2B:
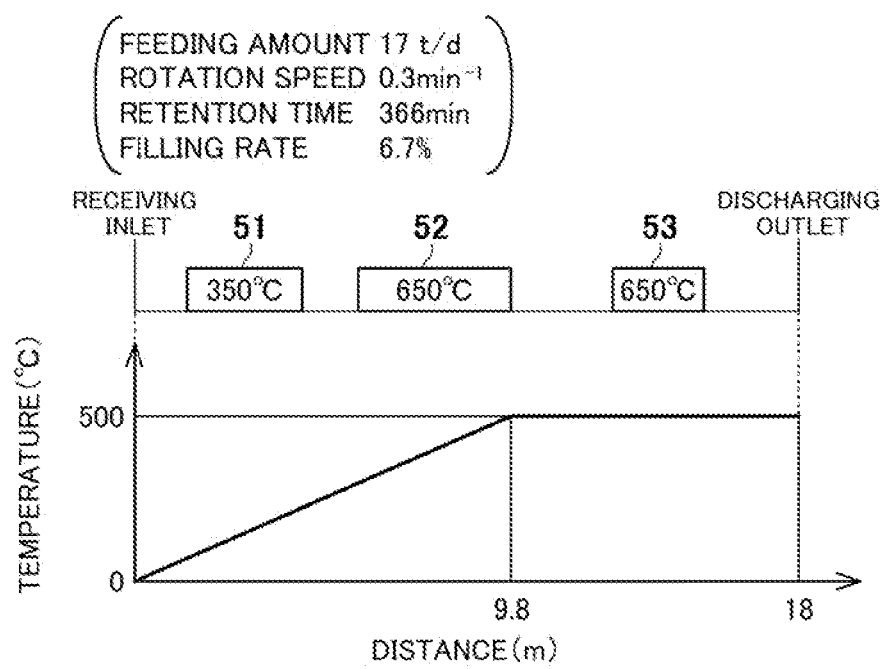

FIGS. 2A and 2B show respective cases where the feeding amount of the to-be-processed objects fed into the roasting apparatus A per day is different from each other. FIGS. 2A and 2B each show one example of a graph indicating the heating temperatures at which the respective heaters 51 to 53 perform the heating and a target internal temperature of the cylindrical body 41 from the receiving inlet 41a to the discharging outlet 41b.

In both cases of FIGS. 2A and 2B, the filling rate X is 6.7 (%). In these examples, the length of the cylindrical body 41 in the axial direction is 18 (m); the internal diameter of the cylindrical body 41 is 1.5 (m); and the internal volume Vi of the cylindrical body 41 is 32 (m$^3$).

In the case of FIG. 2A, the feeding amount of the to-be-processed objects per day (ton/day) is set to 30 (t/d). In order to adjust the filling rate X to 6.7 (%), the rotation speed N of the cylindrical body 41 is calculated as 0.53 (min$^{-3}$) and the retention time T is calculated as 207 (min) by separately performed calculation.

The graph of FIG. 2A shows one example of a relationship between the internal temperature of the cylindrical body 41 and a distance from the receiving inlet 41a of the cylindrical body 41 (i.e., a position in the transporting direction) in a case where the predetermined temperature increase rate Tv is, for example, 2.5 (K/min). The graph of FIG. 2A also shows 250° C., 450° C., and 650° C. as one example of heating temperatures set for the respective heaters 51, 52, and 53 to perform the heating for realizing this relationship.

In a case where the relationship shown in the graph of FIG. 2A is realized, the rotation speed N of the cylindrical body 41 is controlled to 0.53 (min$^{-1}$), and the to-be-processed objects received through the receiving inlet 41a are transported while being heated such that the temperature increase rate of the to-be-processed objects is the predetermined temperature increase rate Tv (2.5 (K/min)). The temperature of the to-be-processed objects reaches 500° C. when their distance from the receiving inlet 41a becomes 17.4 m, and thereafter, the temperature of the to-be-processed objects is kept as it is while the to-be-processed objects are transported to the discharging outlet 41b.

In the case of FIG. 2B, the feeding amount of the to-be-processed objects per day is set to 17 (t/d). In order to adjust the filling rate X to 6.7 (%), the rotation speed N of the cylindrical body 41 is calculated as 0.3 (min$^{-1}$) and the retention time T is calculated as 366 (min) by separately performed calculation.

The graph of FIG. 2B shows one example of a relationship between the internal temperature of the cylindrical body 41 and a distance from the receiving inlet 41a of the cylindrical body 41 (i.e., a position in the transporting direction) in a case where the predetermined temperature increase rate Tv is 2.5 (K/min), which is the same as in the case of FIG. 2A. The graph of FIG. 2B also shows 350° C., 650° C., and 650° C. as one example of heating temperatures set for the respective heaters 51, 52, and 53 to perform the heating for realizing this relationship.

In a case where the relationship shown in the graph of FIG. 2B is realized, the rotation speed N of the cylindrical body 41 is controlled to 0.3 (min$^{-1}$), and the to-be-processed objects received through the receiving inlet 41a are transported while being heated such that the temperature increase rate of the to-be-processed objects is the predetermined temperature increase rate Tv (2.5 (K/min)). The temperature of the to-be-processed objects reaches 500° C. when their distance from the receiving inlet 41a becomes 9.8 m, and thereafter, the temperature of the to-be-processed objects is kept as it is while the to-be-processed objects are transported to the discharging outlet 41b.

It is understood from FIGS. 2A and 2B that in order to adjust the temperature increase rate of the to-be-processed objects to the predetermined temperature increase rate Tv, at least one of the heating temperatures at which the respective heaters 51, 52, and 53 perform the heating needs to be changed in accordance with a change in the rotation speed N of the cylindrical body 41, such that the temperature detected by each temperature sensor St installed in the cylindrical body 41 is a corresponding calculated predetermined temperature (target temperature).

In view of the above, based on the rotation speed N of the cylindrical body 41 and the predetermined temperature increase rate Tv, the controller 21 calculates target temperatures corresponding to the respective temperature detection positions (i.e., the positions of the respective temperature sensors St), the target temperatures enabling the adjustment of the temperature increase rate of the to-be-processed objects to the predetermined temperature increase rate Tv, and adjusts the heating temperatures at which the respective heaters 51, 52, and 53 perform the heating, such that the temperature detected by each temperature sensor St is the corresponding target temperature.

The graphs of FIGS. 2A and 2B illustratively show a temperature range of 0° C. to 500° C. as a temperature range within which the temperature is increased at the predetermined temperature increase rate Tv. However, the temperature range within which the temperature is increased at the predetermined temperature increase rate Tv is not limited to 0° C. to 500° C., but may be, for example, 20° C. to 520° C.

The electrolyte solution contained in a lithium-ion battery can be decomposed and removed from the lithium-ion battery by heating the lithium-ion battery at 150° C. to 200° C. In order to readily recover useful metals such as cobalt from the lithium-ion battery, the heating temperature needs to be such a temperature as to be able to decompose the organic matter, such as a separator and a binder (e.g., higher than or equal to 400° C.). However, the heating temperature needs to be a temperature at which aluminum used in the cathode material of the lithium-ion battery does not melt, i.e., a temperature lower than the melting point of aluminum (660° C.). Therefore, the temperature at the discharging outlet 41b (i.e., the maximum internal temperature of the cylindrical body 41) is preferably higher than or equal to 400° C. and lower than the melting point of aluminum (660° C.).

In the case of operating the roasting apparatus A, for example, before starting operating the roasting apparatus A, an operator determines the rotation speed N of the cylindrical body 41 based on a scheduled processing amount (feeding amount) of the waste lithium-ion batteries for the day. Through operations of the operating device 22 by the operator, the rotation speed N of the cylindrical body 41 is set, and also, the predetermined temperature increase rate Tv is set. The operation of the roasting apparatus A is started in accordance therewith. At the start of the operation, the controller 21 controls the driver 42 of the cylindrical body 41 to rotate the cylindrical body 41 at the set rotation speed N, and also, based on the rotation speed N and the temperature increase rate Tv, the controller 21 calculates target temperatures corresponding to the temperature detection positions of the respective temperature sensors St installed in the cylindrical body 41, and controls the opening degrees of the respective electrically operated valves 55 to 60 to adjust the heating temperatures at which the respective heaters 51, 52, and 53 perform the heating, such that the temperature detected by each temperature sensor St is the corresponding target temperature. The opening degrees of the respective electrically operated valves 55 to 60 at an early stage of the operation may be predetermined in accordance with the rotation speed N and the temperature increase rate Tv.

Described hereinafter is one example of a method of calculating target temperatures Ta corresponding to the respective temperature detection positions, the target temperatures Ta enabling the adjustment of the temperature increase rate of the waste lithium-ion batteries that are being transported inside the cylindrical body 41 to the predetermined temperature increase rate Tv.

Each temperature detection position (the position of each temperature sensor St) is stored in the controller 21 as a distance from the receiving inlet 41a of the cylindrical body 41 to the installation position of the temperature sensor St. A retention time (transport time) Ti (min) from when to-be-processed objects are fed into the cylindrical body 41 through the receiving inlet 41a to when the to-be-processed objects reach the temperature detection position of a particular temperature sensor St can be calculated by an equation below.

$$Ti = k \times xi/N$$

In the equation, xi is the temperature detection position of the particular temperature sensor St (i.e., the aforementioned distance) stored in the controller 21, and k is a coefficient that is determined depending on, for example, the type of the to-be-processed objects (waste lithium-ion batteries) and the type of the kiln included in the transport mechanism 4.

As one example, for the predetermined temperature increase rate Tv (° C./min), the target temperature Ta (° C.) corresponding to the particular temperature detection position (xi) can be calculated by an equation below.

$$Ta = Tv \times Ti + t = Tv \times k \times xi/N + t$$

In the equation, t (° C.) is the temperature at the receiving inlet 41a. Before starting the operation, the temperature t at the receiving inlet 41a may be set together with the rotation speed N of the cylindrical body 41 and the temperature increase rate Tv through operations of the operating device 22 by the operator. For example, if a temperature sensor detecting the temperature of the receiving inlet 41a is installed, then at the time of calculating the target temperature Ta, the controller 21 may calculate the temperature t at the receiving inlet 41a based on a temperature (tx) detected by the temperature sensor by using, for example, an equation t=tx or an equation t=tx+α (α is a predetermined value).

In the above-described manner, the controller 21 can calculate the target temperatures corresponding to the respective temperature detection positions to realize the predetermined temperature increase rate Tv. The upper limit target temperature value is set to a predetermined temperature (e.g., in the cases of FIGS. 2A and 2B, 500° C.).

During the operation, the setting value of the rotation speed N may be changed through an operation of the operating device 22 by the operator. In this case, the controller 21 controls the driver 42 of the cylindrical body 41 to rotate the cylindrical body 41 at the changed rotation speed N (the changed setting value of the rotation speed N), and also, calculates target temperatures corresponding to the respective temperature detection positions and controls the opening degrees of the respective electrically operated valves 55 to 60 to adjust the heating temperatures at which the respective heaters 51, 52, and 53 perform the heating, such that each detected temperature is the corresponding target temperature.

As described above, the rotation speed N of the cylindrical body 41 is set or changed by operating the operating device 22. Alternatively, for example, a weigher that detects the weight of the waste lithium-ion batteries fed into the cylindrical body 41 per unit time may be installed, and the controller 21 may set or change the rotation speed N based on the weighing value of the weigher.

In the roasting apparatus A of the present embodiment, for example, the processes of receiving and discharging the waste lithium-ion batteries can be performed continuously by using the external heat type rotary kiln that is provided with the heaters 51 to 53, the temperatures of which are individually controllable. This makes it possible to improve heat treatment efficiency. In addition, by setting the predetermined temperature increase rate Tv to a suitable temperature increase rate for increasing the grain size of useful metal components such as cobalt (e.g., 2 K/min in the case of the cobalt component), the useful metal recovery rate in a subsequent recovery process, in which the useful metals such as cobalt are recovered by, for example, physical sorting that utilizes, for example, magnetic separation, can be improved. Desirably, for the purpose of improving the recovery rate of useful metals such as cobalt, a suitable temperature increase rate (Tv), or a preferable setting range thereof, for increasing the grain size of each useful metal component is determined in advance through an experiment or the like.

The roasting apparatus A of the present embodiment is not limited to the above-described configuration using the external heat type rotary kiln, but may be configured differently, so long as the roasting apparatus A includes: a transport mechanism (4) including a cylindrical body whose one end is a receiving inlet and whose another end is a discharging outlet, the cylindrical body containing an internal atmosphere that is a reducing atmosphere or a low-oxygen atmosphere, the transport mechanism receiving a waste lithium-ion battery through the receiving inlet, transporting the waste lithium-ion battery inside the cylindrical body toward the discharging outlet, and discharging the waste lithium-ion battery from the discharging outlet; a heating mechanism (5) that heats an outer wall of the cylindrical body to increase an internal temperature of the cylindrical body, and controls heating temperatures individually at which the heating mechanism heats the outer wall at different respective positions in a transporting direction in which the transport mechanism transports the waste lithium-ion battery; and a controller (21) that controls the heating temperatures, at which the heating mechanism heats the outer wall, in accordance with a transporting speed at which the transport mechanism transports the waste lithium-ion battery, such that a temperature increase rate of the waste lithium-ion battery transported inside the cylindrical body is a predetermined temperature increase rate. Accordingly, when the transporting speed, at which the transport mechanism transports the waste lithium-ion battery, is changed, then in accordance with the changed transporting speed, the controller adjusts the heating temperatures, at which the heating mechanism heats the outer wall, such that the temperature increase rate of the waste lithium-ion battery is the predetermined temperature increase rate.

In the present embodiment, the temperature detector 15 is configured by using the temperature sensors St, which are, for example, thermocouples. Alternatively, for example, the temperature detector 15 may be configured by using an optical fiber temperature sensor capable of detecting temperatures at intervals of 1 m.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially modified without departing from the spirit of the present invention.

INDUSTRIAL APPLICABILITY

The present invention is useful, for example, as a waste lithium-ion battery roasting apparatus that makes it possible to improve heat treatment efficiency and to improve a useful metal recovery rate.

The invention claimed is:

1. A waste lithium-ion battery roasting apparatus comprising:
a transport mechanism including a cylindrical body whose one end is a receiving inlet and whose another end is a discharging outlet, the cylindrical body containing an internal atmosphere that is a reducing atmosphere or a low-oxygen atmosphere, the transport mechanism receiving a waste lithium-ion battery through the receiving inlet, transporting the waste lithium-ion battery inside the cylindrical body toward the discharging outlet, and discharging the waste lithium-ion battery from the discharging outlet;
a heating mechanism that heats an outer wall of the cylindrical body to increase an internal temperature of the cylindrical body, and controls heating temperatures individually at which the heating mechanism heats the outer wall at different respective positions in a transporting direction in which the transport mechanism transports the waste lithium-ion battery; and
a controller that controls the heating temperatures, at which the heating mechanism heats the outer wall, in accordance with a transporting speed at which the transport mechanism transports the waste lithium-ion battery, such that a temperature increase rate of the waste lithium-ion battery transported inside the cylindrical body is a predetermined temperature increase rate.

2. The waste lithium-ion battery roasting apparatus according to claim 1, wherein
the cylindrical body of the transport mechanism is a circular cylindrical body supported in such a manner that the circular cylindrical body is rotatable about its center axis, the transport mechanism rotating the circular cylindrical body to transport the waste lithium-ion battery from the receiving inlet toward the discharging outlet at a transporting speed corresponding to a rotation speed of the circular cylindrical body, and
the heating mechanism includes heaters that heat the outer wall of the circular cylindrical body, the heaters being arranged side by side in the transporting direction, in which the transport mechanism transports the waste lithium-ion battery, the heating mechanism controlling heating temperatures individually at which the respective heaters heat the outer wall.

3. The waste lithium-ion battery roasting apparatus according to claim 2, further comprising a temperature detector that detects internal temperatures of the circular cylindrical body at different respective detection positions in the transporting direction of the waste lithium-ion battery, wherein
the controller:
calculates target temperatures corresponding to the respective detection positions based on the predetermined temperature increase rate and the rotation speed of the circular cylindrical body, the target temperatures enabling adjustment of the temperature increase rate of the waste lithium-ion battery to the predetermined temperature increase rate; and
adjusts the heating temperatures, at which the respective heaters heat the outer wall, such that the internal temperature detected at each detection position by the temperature detector is the target temperature corresponding to each detection position.

* * * * *